US 8,467,400 B2

(12) United States Patent
Shimonishi

(10) Patent No.: US 8,467,400 B2
(45) Date of Patent: Jun. 18, 2013

(54) ROUTE SETUP SERVER, ROUTE SETUP METHOD AND ROUTE SETUP PROGRAM

(75) Inventor: Hideyuki Shimonishi, Tokyo (JP)

(73) Assignee: NEC Corporation, Tokyo (JP)

(*) Notice: Subject to any disclaimer, the term of this patent is extended or adjusted under 35 U.S.C. 154(b) by 58 days.

(21) Appl. No.: 13/176,646

(22) Filed: Jul. 5, 2011

(65) Prior Publication Data

US 2011/0261702 A1 Oct. 27, 2011

Related U.S. Application Data

(63) Continuation of application No. PCT/JP2010/054919, filed on Mar. 23, 2010.

(30) Foreign Application Priority Data

Mar. 23, 2009 (JP) ................................. 2009-069794

(51) Int. Cl.
H04L 12/28 (2006.01)

(52) U.S. Cl.
USPC ............ 370/401; 370/238; 370/252; 370/255

(58) Field of Classification Search
USPC ....................................................... 709/238
See application file for complete search history.

(56) References Cited

U.S. PATENT DOCUMENTS

| 7,219,159 | B2 | 5/2007 | Mouri et al. | |
| 7,656,857 | B2* | 2/2010 | Thubert et al. | 370/351 |
| 7,729,260 | B2 | 6/2010 | Larsson | |
| 2003/0223373 | A1 | 12/2003 | Nakamura | |
| 2006/0182034 | A1* | 8/2006 | Klinker et al. | 370/238 |
| 2007/0041345 | A1* | 2/2007 | Yarvis et al. | 370/331 |

FOREIGN PATENT DOCUMENTS

| EP | 0 926 922 A2 | 6/1999 |
| JP | 2986784 B | 10/1999 |
| JP | 2003-23446 A | 1/2003 |
| JP | 2003-233768 A | 8/2003 |
| JP | 2007-515906 A | 6/2007 |

OTHER PUBLICATIONS

European Search Report dated Jul. 31, 2012.

(Continued)

*Primary Examiner* — Duc C Ho
(74) *Attorney, Agent, or Firm* — McGinn IP Law Group, PLLC

(57) ABSTRACT

A route setup server has a storage unit a route designing unit. Next hop information indicating candidates of a next hop node for each node is stored in the storage unit. In response to a route setup request specifying a source node and a destination node of flow, the route designing designs a communication route between them. Specifically, the route designing unit has a next hop determination unit that executes "next hop determination processing" with reference to the next hop information. In the next hop determination processing, the next hop determination unit randomly selects one from the candidates of the next hop node regarding a target node and updates the target node to the selected one. The next hop determination unit determines the communication route one-hop by one-hop by initializing the target node to the source node and then repeating the next hop determination processing until the target node becomes the destination node.

14 Claims, 15 Drawing Sheets

OTHER PUBLICATIONS

Jun Inagaki et al., "A method of Determining Various Solutions for Routing Application with a Genetic Algorithm", The Transactions of the Institute of Electronics, Information and Communication Engineers, D-I, vol. J82-D-I, No. 8 (19990825), pp. 1102-1111.

Osamu Mizuno, "Contents discovery methods applying user relationship on ad-hoc network", IEICE Technical Report, vol. 106, No. 578, Mar. 1, 2007, p. 16.

Nick McKeown et al., "OpenFlow: Enabling Innovation in Campus Networks," [online], [Searched on Dec. 14, 2009], Internet <URL: http://www.openflowswitch.org//documents/openflow-wp-latest.pdf>, Mar. 14, 2008.

* cited by examiner

Fig. 5

< ROUTING TABLE 220-i FOR TARGET NODE 5-i >

| DESTINATION NODE | NEXT HOP NODE | SELECTION PROBABILITY |
|---|---|---|
| 5-1 | 5-i1(1) | Pi1(1) |
|  | 5-i1(2) | Pi1(2) |
| ⋮ | ⋮ | ⋮ |
| 5-j ($j=1 \sim n \neq i$) | 5-ij(1) | Pij(1) |
|  | ⋮ | ⋮ |
|  | 5-ij(k) | Pij(k) |
|  | ⋮ | ⋮ |
|  | 5-ij(m) | Pij(m) |
| ⋮ | ⋮ | ⋮ |
| 5-n |  |  |

Fig. 7

230: ROUTE NODE LIST

| |
|---|
| SOURCE NODE 5-S |
| RELAY NODE 5-r1 |
| RELAY NODE 5-r2 |
| ⋮ |
| DESTINATION NODE 5-D |

Fig. 10

240: ROUTE CACHE INFORMATION

| SOURCE NODE | DESTINATION NODE | ROUTE NODE LIST | SELECTION PROBABILITY |
|---|---|---|---|
| | | | |
| | | | |
| | | | |
| | | | |
| | | | |

Fig. 13

250: LINK COST TABLE

| LINK START-POINT NODE | LINK END-POINT NODE | LINK COST |
|---|---|---|
| | | |
| | | |
| | | |
| | | |
| | | |

Fig. 14

260: ROUTE COST TABLE

|  |  | DESTINATION NODE | | | |
|---|---|---|---|---|---|
|  |  | 5-1 | 5-2 | ... | 5-n |
| SOURCE NODE | 5-1 | 0 |  | ... |  |
|  | 5-2 |  | 0 | ... |  |
|  | ⋮ | ⋮ | ⋮ | ⋱ | ⋮ |
|  | 5-n |  |  | ... | 0 |

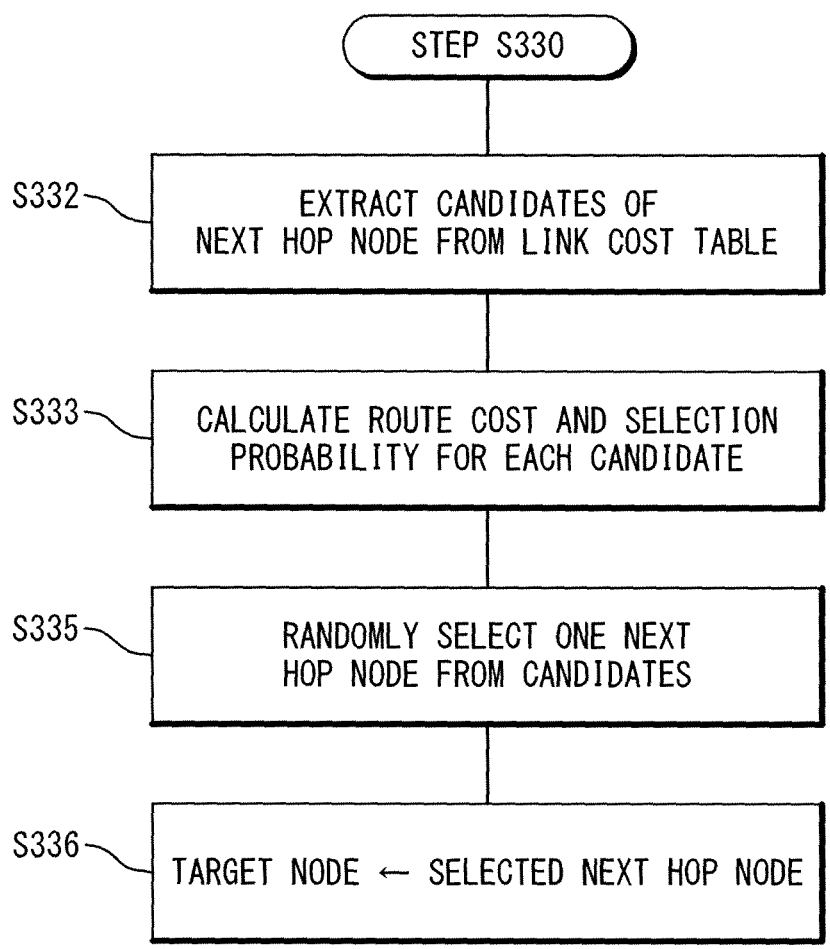

ROUTE SETUP SERVER, ROUTE SETUP METHOD AND ROUTE SETUP PROGRAM

CROSS-REFERENCE TO RELATED APPLICATION

This is a continuation of International Application No. PCT/JP2010/054919, filed on Mar. 23, 2010.

TECHNICAL FIELD

The present invention relates to a technique that determines a communication route of a flow in a communication network by using a route setup server.

BACKGROUND ART

A communication network system in which a management server performs centralized management of a communication network including a plurality of nodes is known. The management server, when receiving a route setup request regarding a flow, determines a communication route of the flow in the communication network. Such the management server that determines the communication route of the flow is hereinafter also referred to as a "route setup server".

As an algorithm for calculating a shortest route from a source node to a destination node, "Dijkstra's Algorithm" is commonly known. However, in a case where communications of a plurality of flows are performed between the source node and the destination node, to simply use the Dijkstra's Algorithm results in the same communication route (shortest route) being employed for the plurality of flows. This causes increase in load imposed on the communication route and thus reduction in communication efficiency.

In order to distribute load, it is preferable to set up different communication routes for different flows between the same pair of source node and destination node. To this end, it is considered to extract not only the shortest route but also other communication routes between the source node and the destination node. The followings are known as a technique for calculating a plurality of communication routes from a source node to a destination node.

Patent Literature 1 (Japanese Patent Publication JP-2003-233768) describes a method of calculating a plurality of communication routes from a start-point to an end-point by the use of the Dual Dijkstra's Algorithm. More specifically, regarding all intermediate nodes, respective shortest route trees from the start-point are created by the Dijkstra's Algorithm. Also, regarding all the intermediated nodes, respective shortest route trees from the end-point are created by the Dijkstra's Algorithm. Then, the two kinds of shortest route trees are combined to calculate a plurality of communication routes from the start-point to the end-point through the respectively different intermediate nodes. Besides, a method of calculating a plurality of routes by combining plural times of the Dijkstra's Algorithm is described also in Patent Literature 2 (Japanese Patent Publication JP-2003-23446).

Non-Patent Literature 1 (Jun Inagaki et al., "A method of Determining Various Solutions for Routing Application with a Genetic Algorithm", The Transactions of the Institute of Electronics, Information and Communication Engineers, D-I, Vol. J82-D-I, No. 8 (19990825), pp. 1102-1111.) describes a method of simultaneously calculating a plurality of communication routes by the use of a genetic algorithm.

Patent Literature 3 (Japanese Patent Publication JP-2007-515906) describes a cost determining method in a multi-hop communication network. The cost determining method includes a step of determining a plurality of concurrently possible next hop nodes with regard to at least one of a plurality of nodes from a source node to a destination node in a network. The plurality of concurrently possible plurality of nodes optimizes a predetermined cost function. Furthermore, the cost determining method includes a step of determining an optimum cost of at least one of the plurality of nodes so as to be equal to the above-mentioned optimized value of the predetermined cost function.

CITATION LIST

Patent Literature

[Patent Literature 1] Japanese Patent Publication JP-2003-233768

[Patent Literature 2] Japanese Patent Publication JP-2003-23446

[Patent Literature 3] Japanese Patent Publication JP-2007-515906

Non Patent Literature

[Non-Patent Literature 1] Jun Inagaki et al., "A method of Determining Various Solutions for Routing Application with a Genetic Algorithm", The Transactions of the Institute of Electronics, Information and Communication Engineers, D-I, Vol. J82-D-I, No. 8 (19990825), pp. 1102-1111.

SUMMARY OF INVENTION

In order to distribute load imposed on a communication network, it is desirable to set up different communication routes for different flows between the same pair of source node and destination node. To this end, it is considered to calculate a plurality of communication routes from the source node to the destination node, as described in the above-mentioned related techniques. When a new flow occurs, the load can be distributed by selecting an appropriate one from the plurality of communication routes and then allocating the selected communication route to the new flow.

However, according to the above-mentioned related techniques, calculation amount in the route setup server determining the communication route becomes enormous. In the case where the Dijkstra's Algorithm is employed, the calculation amount increases exponentially in proportion to a total number of nodes. For example, in a case of an 8-dimensional hypercube network, the communication route between a source node and a destination node has approximately forty thousand patterns, and to calculate all of them beforehand is practically impossible. Also, in the case where the genetic algorithm is employed, a long convergence time is required for the calculation and the calculation amount is still enormous, which is the problem.

An object of the present invention is to reduce calculation amount in a route setup server when determining a communication route of a flow in communication network by using the route setup server.

In an aspect of the present invention, a route setup server that determines a communication route of a flow in a communication network that includes a plurality of nodes is provided. The route setup server has a storage unit and a route designing unit. Next hop information is stored in the storage unit, wherein the next hop information indicates, with respect to each of the plurality of nodes, a candidate of a next hop node being a forwarding destination of a data. In response to a route setup request specifying a source node and a destination node of a flow, the route designing unit designs a communication route from the source node to the destination node. More specifically, the route designing unit has: a next hop determination unit configured to execute "next hop determination processing" with reference to the next hop information; a loop detection unit; and a loop removal unit. In the next hop determination processing, the next hop determination unit randomly selects one next hop node from the candidate of the next hop node regarding a target node and updates the target node to the above-mentioned selected one next hop node. The next hop determination unit determines the communication route one-hop by one-hop by initializing the target node to the source node and then repeating the next hop determination processing until the target node becomes the destination node. The loop detection unit checks whether or not a current target node overlaps with a past target node to detect a loop on the communication route determined by then. If the loop is detected, the loop removal unit removes the loop by turning the target node back to any past target node. After the loop is removed, the next hop determination unit starts over the next hop determination processing from the above-mentioned any past target node.

In another aspect of the present invention, a communication network system is provided. The communication network system has: a communication network including a plurality of nodes; and a route setup server that determines a communication route of a flow in the communication network. The route setup server has a storage unit and a route designing unit. Next hop information is stored in the storage unit, wherein the next hop information indicates, with respect to each of the plurality of nodes, a candidate of a next hop node being a forwarding destination of a data. In response to a route setup request specifying a source node and a destination node of a flow, the route designing unit designs a communication route from the source node to the destination node. More specifically, the route designing unit has: a next hop determination unit configured to execute "next hop determination processing" with reference to the next hop information; a loop detection unit; and a loop removal unit. In the next hop determination processing, the next hop determination unit randomly selects one next hop node from the candidate of the next hop node regarding a target node and updates the target node to the above-mentioned selected one next hop node. The next hop determination unit determines the communication route one-hop by one-hop by initializing the target node to the source node and then repeating the next hop determination processing until the target node becomes the destination node. The loop detection unit checks whether or not a current target node overlaps with a past target node to detect a loop on the communication route determined by then. If the loop is detected, the loop removal unit removes the loop by turning the target node back to any past target node. After the loop is removed, the next hop determination unit starts over the next hop determination processing from the above-mentioned any past target node.

In still another aspect of the present invention, a route setup method that determines a communication route of a flow in a communication network that includes a plurality of nodes, is provided. The route setup method includes: (A) storing next hop information in a storage device, wherein the next hop information indicates, with respect to each of the plurality of nodes, a candidate of a next hop node being a forwarding destination of a data; and (B) designing, in response to a route setup request specifying a source node and a destination node of a flow, a communication route from the source node to the destination node. The above-mentioned (B) Step includes: (B1) executing "next hop determination processing" with reference to the next hop information. Here, the next hop determination processing includes: randomly selecting one next hop node from the candidate of the next hop node regarding a target node; and updating the target node to the selected one next hop node. The above-mentioned (B) Step further includes: (B2) determining the communication route one-hop by one-hop by initializing the target node to the source node and then repeating the next hop determination processing until the target node becomes the destination node; (B3) checking whether or not a current target node overlaps with a past target node to detect a loop on the communication route determined by then; (B4) removing, if the loop is detected, the detected loop by turning the target node back to any past target node; and (B5) starting over the next hop determination processing from the any past target node, after the loop is removed.

In still another aspect of the present invention, a route setup program recorded on a tangible computer-readable medium that, when executed, causes a computer to perform route setup processing that determines a communication route of a flow in a communication network that includes a plurality of nodes, is provided. The route setup processing includes: (A) storing next hop information in a storage device, wherein the next hop information indicates, with respect to each of the plurality of nodes, a candidate of a next hop node being a forwarding destination of a data; and (B) designing, in response to a route setup request specifying a source node and a destination node of a flow, a communication route from the source node to the destination node. The above-mentioned (B) Step includes: (B1) executing "next hop determination processing" with reference to the next hop information. Here, the next hop determination processing includes: randomly selecting one next hop node from the candidate of the next hop node regarding a target node; and updating the target node to the selected one next hop node. The above-mentioned (B) Step further includes: (B2) determining the communication route one-hop by one-hop by initializing the target node to the source node and then repeating the next hop determination processing until the target node becomes the destination node; (B3) checking whether or not a current target node overlaps with a past target node to detect a loop on the communication route determined by then; (B4) removing, if the loop is detected, the detected loop by turning the target node back to any past target node; and (B5) starting over the next hop determination processing from the any past target node, after the loop is removed.

According to the present invention, it is possible to reduce calculation amount in a route setup server when determining a communication route of a flow in communication network by using the route setup server.

BRIEF DESCRIPTION OF DRAWINGS

The above and other objects, advantages and features of the present invention will be more apparent from the following description of certain exemplary embodiments taken in conjunction with the accompanying drawings.

FIG. 5 is a conceptual diagram showing a routing table.

FIG. 7 is a conceptual diagram showing a route node list.

FIG. 10 is a conceptual diagram showing route cache information.

FIG. 13 is a conceptual diagram showing a link cost table.

FIG. 14 is a conceptual diagram showing a route cost table.

FIG. 15 is a flow chart showing next hop determination processing in the third exemplary embodiment.

DESCRIPTION OF EMBODIMENTS

Exemplary embodiments of the present invention will be described with reference to the attached drawings.

1. Communication Network System

Figure 1:
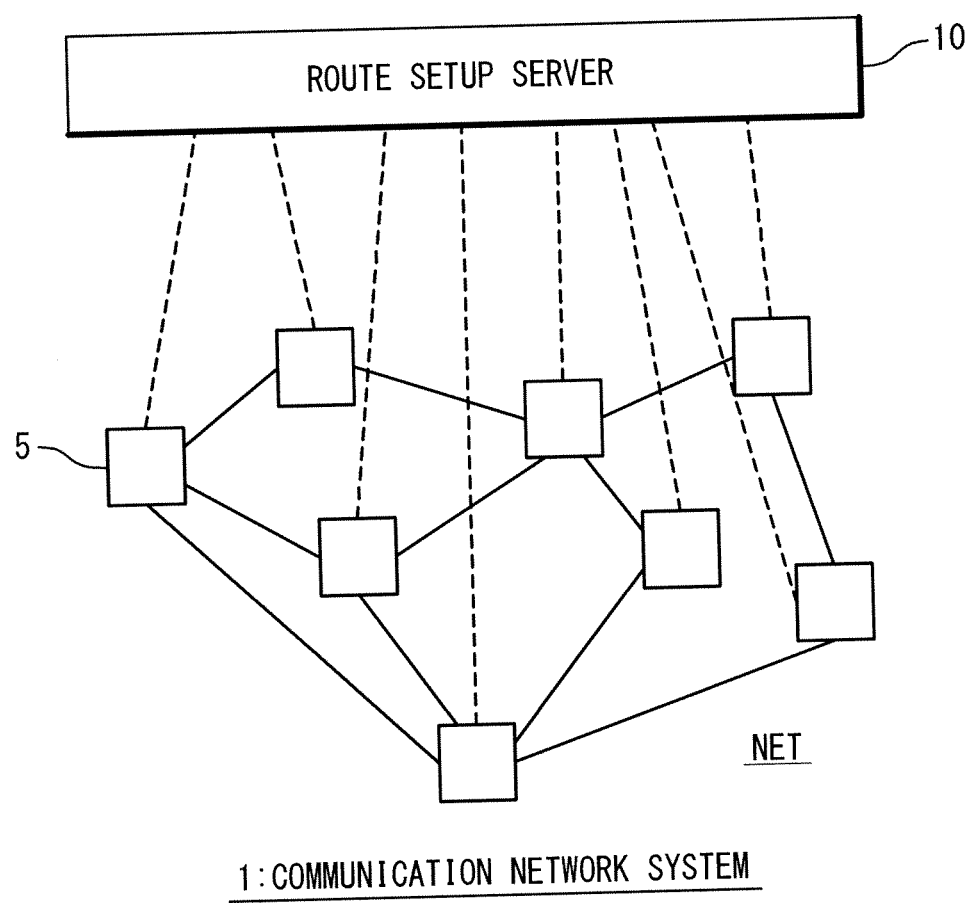
FIG. 1 is a schematic diagram showing a communication network system according to an exemplary embodiment of the present invention.

FIG. 1 is a schematic diagram showing a communication network system 1 according to an exemplary embodiment of the present invention. The communication network system 1 has a communication network NET that includes a plurality of nodes 5. In the present exemplary embodiment, the communication network NET includes n nodes 5-1 to 5-n (n is an integer equal to or more than 2).

The communication network system 1 further has a route setup server 10. The route setup server 10 is a management server (management computer) that performs centralized management of the communication network NET and is able to bi-directionally communicate with the plurality of nodes 5-1 to 5-n. In particular, the route setup server 10 determines a communication route of a flow in the communication network NET. More specifically, when a flow occurs, the route setup server 10 receives a route setup request regarding the flow from the communication network NET. The route setup request specifies a source node and a destination node of the flow. In response to the route setup request, the route setup server 10 determines a communication route from the source node to the destination node.

When the communication route is determined, the route setup server 10 instructs each node 5 on the determined communication route to forward data (packet, frame) of the flow along the determined communication route. Each node 5 performs setting of itself in accordance with the instruction.

For example, each node 5 is provided with a "forwarding table". The forwarding table is a table that indicates a correspondence relationship between input sources and forwarding destinations of a flow data (packet, frame). Each node 5 can forward a flow data received from an input source to a designated forwarding destination, by referring to the forwarding table. In this case, the route setup server 10 instructs each node 5 to set up the forwarding table such that the flow data is forwarded along the determined communication route. Each node 5 sets up contents of its own forwarding table in accordance with the instruction from the route setup server 10.

Various interfaces are possible as an interface between the route setup server 10 and the nodes 5 for achieving the processing described above. For example, Openflow (refer to http://www.openflowswitch.org/) is applicable. In this case, an "Openflow Controller" serves as the route setup server 10 and an "Openflow Switch" serves as each node 5. It is possible to set up the forwarding table by using "Secure Channel" of the Openflow.

2. Outline of Route Setup Processing

Figure 2:
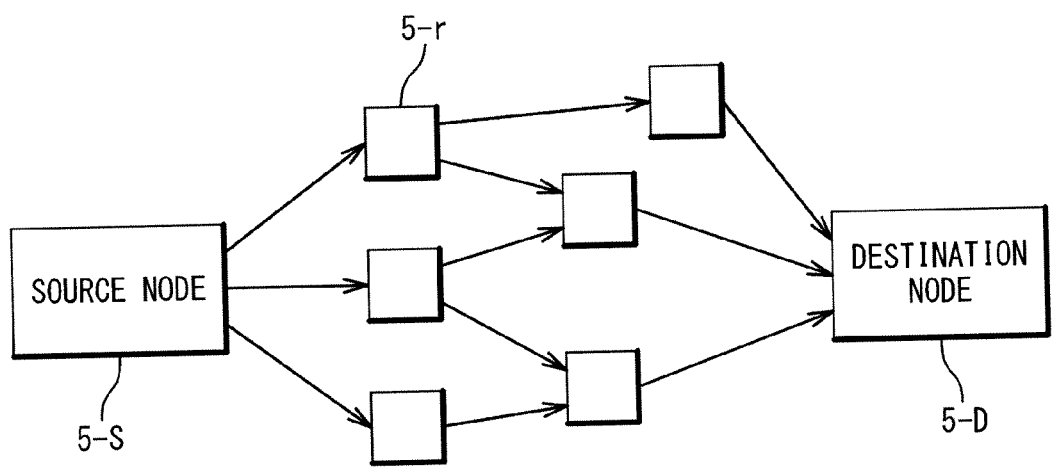
FIG. 2 is a conceptual diagram showing a plurality of communication routes from a source node to a destination node.

FIG. 2 is a conceptual diagram showing a plurality of communication routes from a source node 5-S to a destination node 5-D. In many cases, there exists a plurality of communication routes from the source node 5-S to the destination node 5-D, as shown in FIG. 2. Each communication route includes some relay nodes 5-r, and different communication routes are configured by different combinations of relay nodes 5-r. In order to distribute load imposed on the communication network NET, it is desirable to set up different communication routes for different flows between the same pair of source node 5-S and destination node 5-D.

The route setup server 10 according to the present exemplary embodiment determines the communication route of a flow such that the load imposed on the communication network NET is distributed. That is, the route setup server 10 determines different communication routes for different flows between the same pair of source node 5-S and destination node 5-D, as possible. To this end, the route setup server 10, when determining a communication route of a flow, "randomly" determines the relay node 5-r one-hop by one-hop from the source node 5-S towards the destination node 5-D of the flow. That is, on determining the route, randomness is introduced for each hop. As a result, it becomes highly probable that different communication routes are determined for different flows. Therefore, the load imposed on the communication network NET is distributed and thus the communication efficiency is improved.

According to the present exemplary embodiment, when a communication route of a flow is determined, there is no need to calculate a plurality of communication routes from the source node 5-S to the destination node 5-D. Instead, a random one of candidates of the relay node 5-r is selected for each hop. In this case, the number of calculation times in the route setup server 10 is at most a total number of hops on the communication route. Therefore, the calculation amount in the route setup server 10 is greatly reduced. That is, according to the present exemplary embodiment, it is possible to distribute the load imposed on the communication network NET with reducing the calculation amount in the route setup server 10.

It should be noted that the route setup processing as described above can be achieved by the route setup server 10 executing a route setup program. The route setup program is a computer program that is executed by the route setup server 10. The route setup program may be recorded on a tangible computer-readable recording medium.

3. Various Examples of Route Setup Server 3-1. First Exemplary Embodiment

Figure 3:
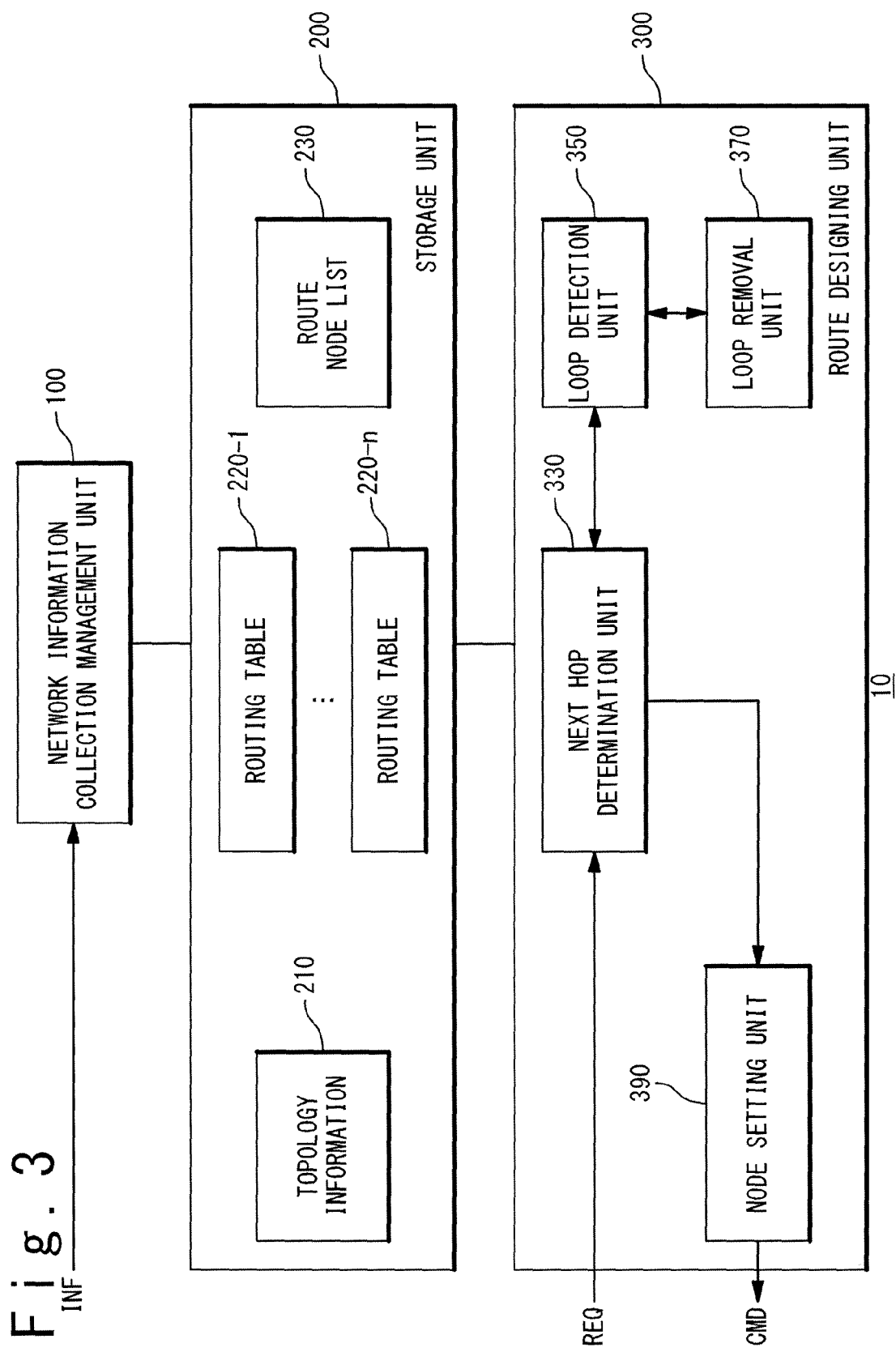
FIG. 3 is a block diagram showing a configuration of a route setup server according to a first exemplary embodiment of the present invention.

FIG. 3 is a block diagram showing a configuration of the route setup server 10 according to a first exemplary embodiment. The route setup server 10 has a network information collection management unit 100, a storage unit 200 and a route designing unit 300.

The network information collection management unit 100 collects network information INF. The network information INF is information on the communication network NET and includes information on a connection state between the nodes 5 and link costs. Based on the collected network information INF, the network information collection management unit 100 creates and updates various information and tables stored in the storage unit 200. It should be noted that the network information collection management unit 100 is realized by the route setup server 10 executing the route setup program.

The storage unit 200 is a storage device such as a RAM and an HDD. Topology information 210, routing tables 220-1 to 220-*n*, a route node list 230 and the like are stored in the storage unit 200/

The topology information 210 indicates a connection state between the nodes 5, namely a physical topology of the communication network NET. The topology information 210 is created and updated by the network information collection management unit 100.

Figure 4:
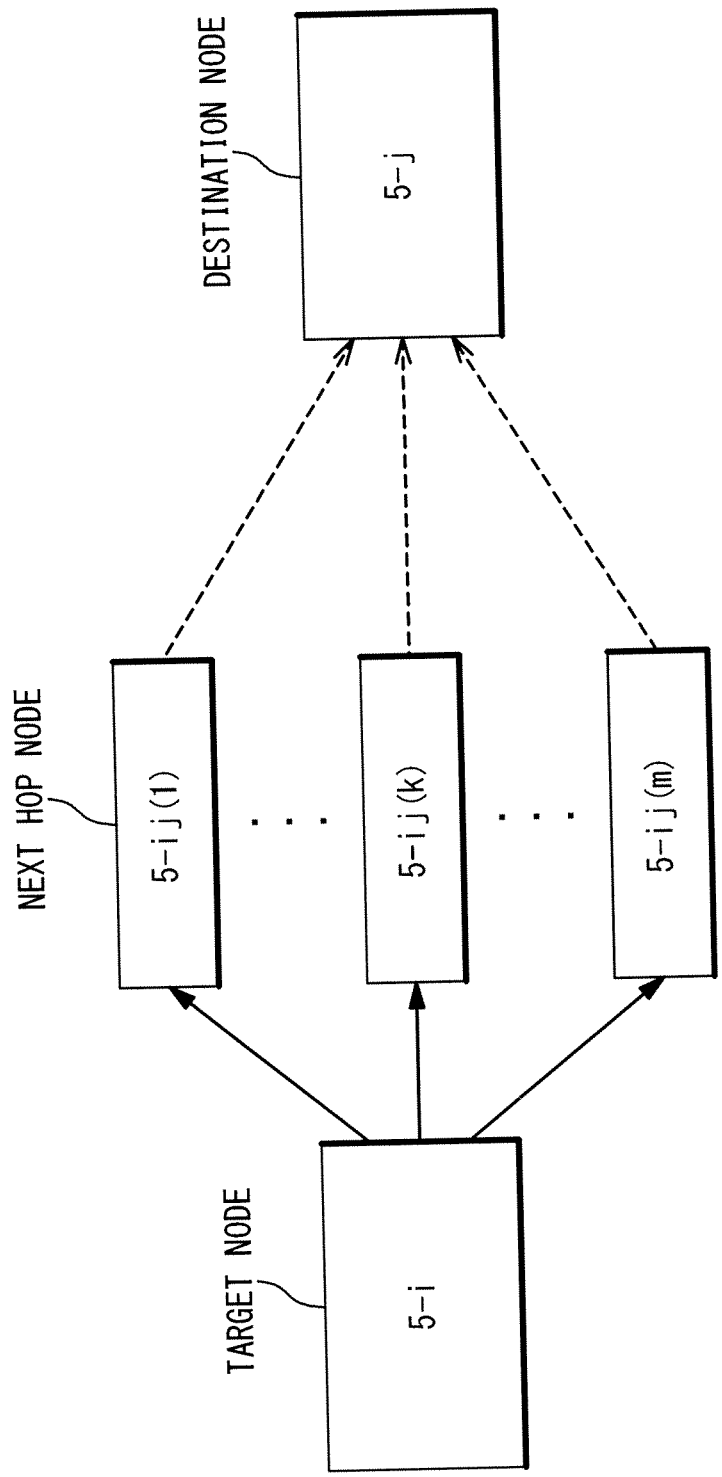
FIG. 4 is a conceptual diagram showing a relationship between a target node, a destination node and next hop nodes.

Next, in order to explain the routing table 220, let us describe a "target node" and a "next hop node" with reference to FIG. 4. A target node 5-*i* is any of the nodes 5-1 to 5-*n* (i=1 to n). A destination node 5-*j* is any of the nodes 5-1 to 5-*n* and different from the target node 5-*i* (j=1 to n, j≠i). Let us consider a case where a flow data is transferred from the target node 5-*i* to the destination node 5-*j*. In this case, the next node as a forwarding destination of the flow data from the target node 5-*i* is the "next hop node 5-*ij*". That is, the next hop node 5-*ij* is a node of the next hop from the target node 5-*i* through which the flow data passes. A plurality of candidates of the next hop node 5-*ij* may exist with regard to a target node 5-*i*. When there is m candidates (m is a natural number), the respective candidates are expressed by 5-*ij*(1) to 5-*ij*(m). To generalize, there exists a next hop node candidate 5-*ij*(k); k=1 to m, with regard to a target node 5-*i*. It should be noted that the next hop node candidate 5-*j*(k) may be back away from the destination node 5-*j*.

The routing table 220 serves as "next hop information" that indicates the candidate of the next hop node described above. More specifically, the routing tables 220-1 to 220-*n* are prepared for the nodes 5-1 to 5-*n*, respectively. That is, the target node 5-*i* and the routing table 220-*i* are associated with each other. The routing table 220-*i* indicates the next hop node candidate 5-*ij*(k) regarding the target node 5-*i*.

FIG. 5 shows an example of the routing table 220-*i* with respect to the target node 5-*i*. As shown in FIG. 5, the routing table 220-*i* indicates the next hop node candidate 5-*ij*(k) with respect to each destination node 5-*j* (j=1 to n, j≠i). Furthermore, the routing table 220-*i* indicates a "selection probability Pij(k)" that is defined for each next hop node candidate 5-*ij*(k). The selection probability Pij(k) is a probability with which the next hop node 5-*j*(k) is selected from the m next hop node candidate 5-*ij*(1) to 5-*ij*(m). A sum of m selection probabilities Pij(k) is 1.

[Equation 1]

$$\sum_{k=1}^{m} Pij(k) = 1 \quad (1)$$

Various methods are possible as a method for calculating the selection probability Pij(k). For example, a cost (route cost) of the shortest route from the target node 5-*i* to the destination node 5-*j* through the next hop node candidate 5-*ij*(k) is calculated. The route cost is a sum of link costs of respective links that constitutes the route. The link cost is increased as a bandwidth is lower, an available capacity is smaller, a delay time is longer and the number of packet loss is larger. Then, a value in inverse proportion to the calculated route cost is used as the selection probability Pij(k). By using the network information INF and the topology information 210 mentioned above, the network information collection management unit 100 calculates each selection probability Pij(k) and creates and updates each routing table 220-*i*.

Referring to FIG. 3 again, the route node list 230 stored in the storage unit 200 is information indicating a communication route that is designed by the route designing unit 300 described hereinafter.

Figure 6:
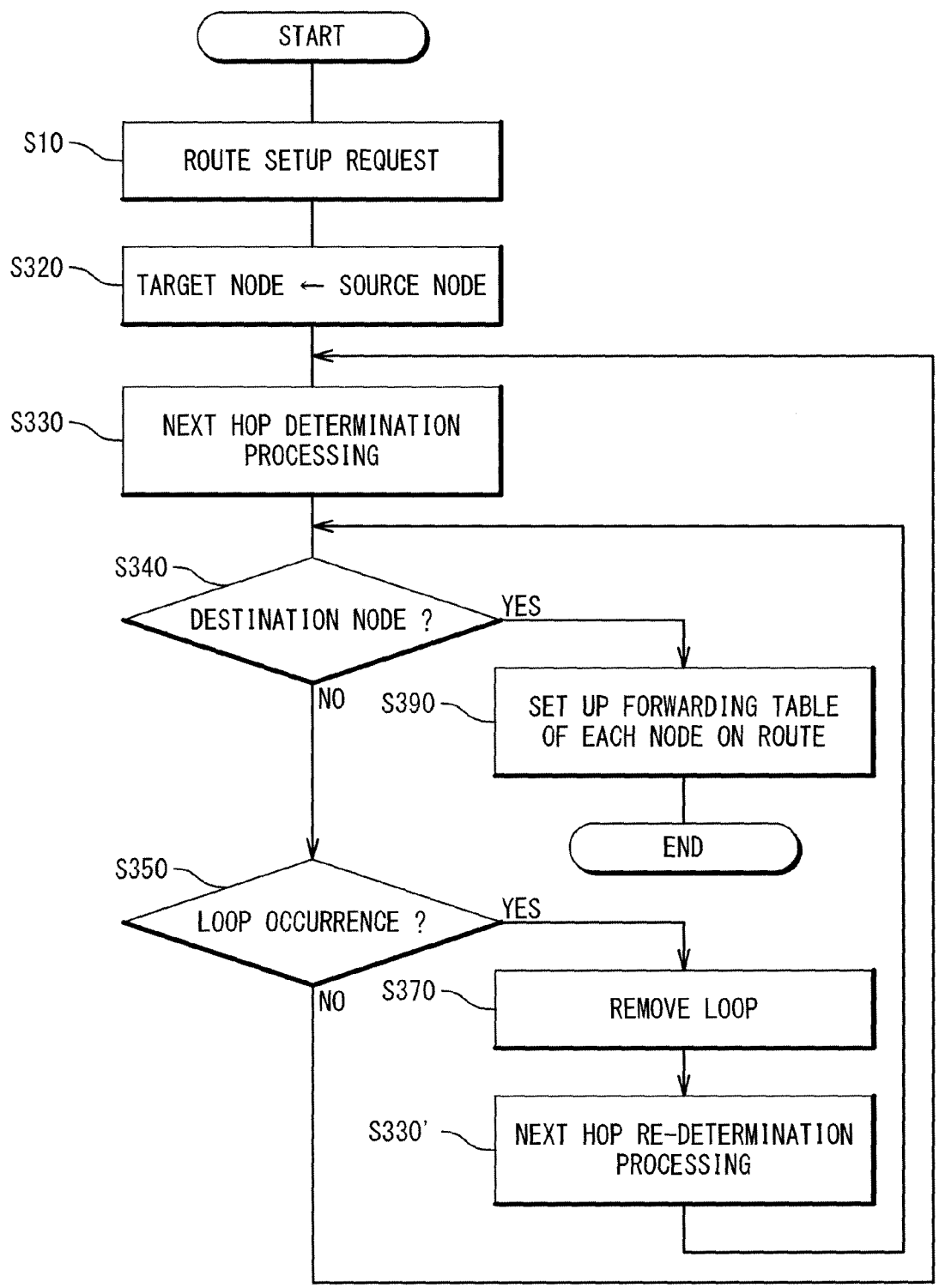
FIG. 6 is a flow chart showing a route setup method according to the first exemplary embodiment.

The route designing unit 300 is realized by the route setup server 10 executing the route setup program. The route designing unit 300 includes a next hop determination unit 330, a loop detection unit 350, a loop removal unit 370 and a node setting unit 390. These functional blocks refer to the information and tables stored in the storage unit 200 to execute route setup processing according to the present exemplary embodiment. FIG. 6 is a flow chart showing the route setup processing according to the present exemplary embodiment. FIG. 7 conceptually shows the route node list 230. Hereinafter, the route setup processing according to the present exemplary embodiment will be described in detail.

Step S10:

When a flow occurs, the route designing unit 300 receives a route setup request REQ regarding the flow from the communication network NET. The route setup request REQ specifies a source node 5-S and a destination node 5-D of the flow.

Step S320:

The next hop determination unit 330 receives the route setup request REQ and recognizes the source node 5-S and the destination node 5-D. Then, the next hop determination unit 330 initializes the target node 5-*i* to the source node 5-S. The next hop determination unit 330 writes the source node 5-S as a first entry in the route node list 230 (see FIG. 7).

Figure 8:
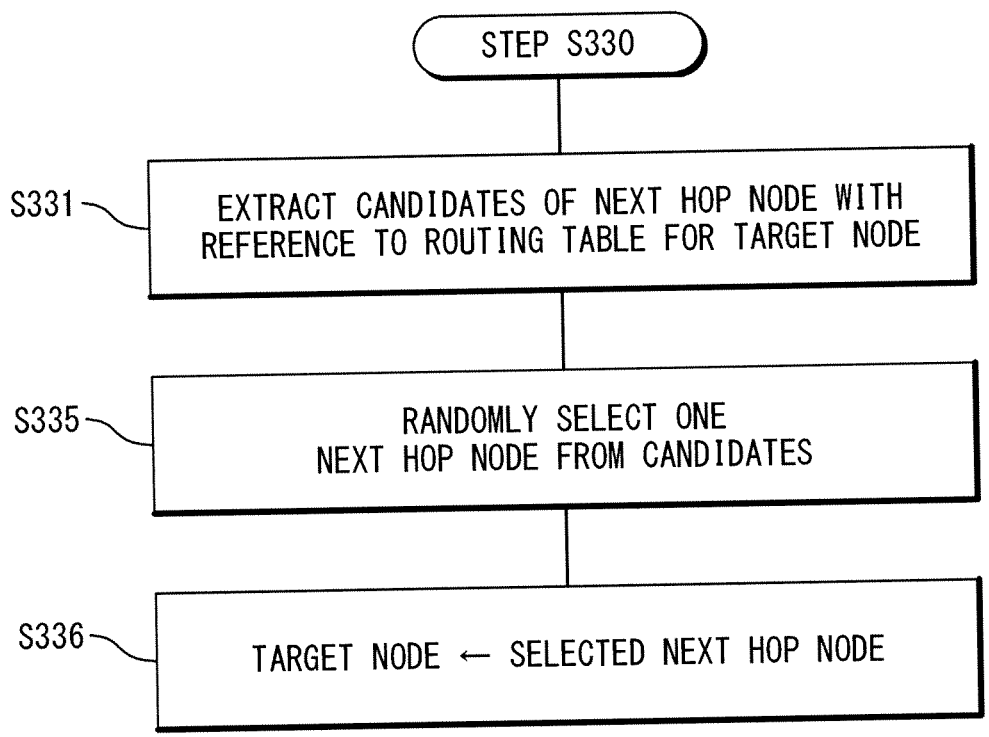
FIG. 8 is a flow chart showing next hop determination processing in the first exemplary embodiment.

Step S330:

The next hop determination unit 330 executes "next hop determination processing" with regard to the current target node 5-*i*. In the next hop determination processing, the next hop determination unit 330 "randomly" selects the next hop node with reference to the routing table 220-*i* (next hop information) associated with the target node 5-*i*. FIG. 8 is a flow chart showing the next hop determination processing in the present exemplary embodiment.

Step S331:

The next hop determination unit 330 refers to the routing table 220-*i* for the current target node 5-*i*. Then, the next hop determination unit 330 extracts the next hop node candidate 5-*ij*(1) to 5-*ij*(m) toward the destination node 5-*j* (=node 5-D).

Step S335:

Subsequently, the next hop determination unit 330 randomly selects one next hop node 5-*ij* from the extracted next hop node candidate 5-*ij*(1) to 5-*ij*(m). For example, the next hop determination unit 330 utilizes a random number and the selection probability Pij(k). The selection probability Pij(k) of the next hop node candidate 5-*ij*(k) is read out from the routing table 220-*i*.

As an example, let us consider a case where m=3 and the selection probabilities Pij(1) to Pij(3) of the next hop node candidates 5-*ij*(1) to 5-*j*(3) are 0.2, 0.3 and 0.5, respectively. In this case, numerical value ranges with regard to the next hop node candidates 5-*ij*(1) to 5-*ij*(3) are defined depending on the respective selection probabilities Pij(1) to Pij(3). For example, the next hop determination unit 330 associates a range of not less than 0.0 and less than 0.2 with the next hop node candidate 5-*ij*(1), a range of not less than 0.2 and less than 0.5 with the next hop node candidate 5-*ij*(2), and a range of not less than 0.5 and less than 1.0 with the next hop node candidate 5-*ij*(3). Then, the next hop determination unit 330 generates a random number X within a range of not less than 0.0 and less than 1. The next hop determination unit 330 selects a next hop node candidate that is associated with the numerical value range including the generated random number X. For example, if the random number X is 0.3, the next hop determination unit 330 selects the next hop node candidate 5-*ij*(2). In this manner, one next hop node 5-*j* can be randomly selected in accordance with the above-mentioned selection probability Pij(k).

Step S336:

When the next hop node 5-*ij* is selected, the next hop determination unit 330 adds the selected next hop node 5-*ij* as a relay node 5-*r* to the route node list 230 (see FIG. 7). Also, the next hop determination unit 330 updates the target node 5-*i* to the selected next hop node 5-*ij*.

Step S340:

Returning back to FIG. 6, after the next hop determination processing (Step S330) is completed, the next hop determination unit 330 checks whether or not the post-update target node 5-*i* (the selected next hop node) becomes the destination node 5-D. In other words, the next hop determination unit 330 checks whether or not the target node 5-*i* reaches the destination node 5-D.

Step S350:

If the target node 5-*i* does not yet reach the destination node 5-D (Step S340; No), the loop detection unit 350 determines whether or not a loop is occurring on the route determined by then. More specifically, the loop detection unit 350 refers to the route node list 230 to check whether or not the current target node 5-*i* (the bottom entry in the route node list 230) overlaps with the past target nodes (entries other than the bottom entry). If the current target node 5-*i* overlaps with any of the past target nodes, the loop detection unit 350 detects that a loop is occurring on the route determined by then.

If no loop is occurring (Step S350; No), the processing returns back to the Step S330, and the next hop determination unit 330 executes the next hop determination processing with regard to the new target node 5-*i*. On the other hand, if a loop is detected (Step S350; Yes), the processing proceeds to Step S370.

Step S370:

The loop removal unit 370 removes the detected loop. To this end, the loop removal unit 370 removes some entry recorded on the route node list 230 from the bottom side. That is, the loop removal unit 370 turns the target node 5-*i* back to any past target node. In other words, the loop removal unit 370 degenerates the route determined by then.

Some policies for entry deletion are considered. For example, the loop removal unit 370 deletes the last entry in the route node list 230. This is equivalent to turning the target node 5-*i* back by just one hop. Alternatively, the loop removal unit 370 may delete entries up to the loop starting location (a location where the overlapping node first appears). This is equivalent to turning the target node 5-*i* from the current one back to the past one overlapping with the current one. Alternatively, the loop removal unit 370 may delete entries up to a location where the selection probability Pij(k) begins to decrease, by referring to the routing table 220-*i* with returning one-hop by one-hop.

Step S330':

After the loop is removed by the loop removal unit 370, the next hop determination unit 330 starts over the next hop determination processing (Step S330) from the new target node 5-*i*. In this re-determination processing, the next hop determination unit 330 may exclude the previously selected next hop node 5-*ij* from the candidates. In this case, the next hop determination unit 330 randomly selects one next hop node other than the previously selected one from the next hop node candidates 5-*ij*(1) to 5-*ij*(m). If the next hop node candidate includes only the previously selected one, the next hop determination unit 330 further deletes the last entry in the route node list 230 to turn the target node 5-*i* back by just one hop and then starts over the next hop determination processing. After the next hop determination processing, the processing returns back to the Step S340.

The processing described above is repeated, and the next hop determination unit 330 randomly determines the relay node 5-*r* one-hop by one-hop from the source node 5-S towards the destination node 5-D. Eventually, the target node 5-*i* reaches the destination node 5-D (Step S340; Yes). That is, the communication route from the source node 5-S to the destination node 5-D is determined. In this manner, the route designing unit 330 according to the present exemplary embodiment determines the communication route from the source node 5-S to the destination node 5-D randomly and one-hop by one-hop by repeating the next hop determination processing.

Step S390:

After the communication route is determined, the node setting unit 390 instructs each node 5 on the determined communication route to forward the flow data (packet, frame) along the determined communication route. More specifically, the node setting unit 390 transmits a forwarding table setting command CMD to each node 5 registered on the route node list 230. The forwarding table setting command CMD is a command that instructs to set up the forwarding table such that the flow data is forwarded along the above determined communication route.

Each node 5 on the determined communication route receives the forwarding table setting command CMD from the route setup server 10 and sets contents of its own forwarding table in accordance with the command. As a result, data of the flow are transferred from the source node 5-S to the destination node 5-D.

3-2. Second Exemplary Embodiment

Figure 9:
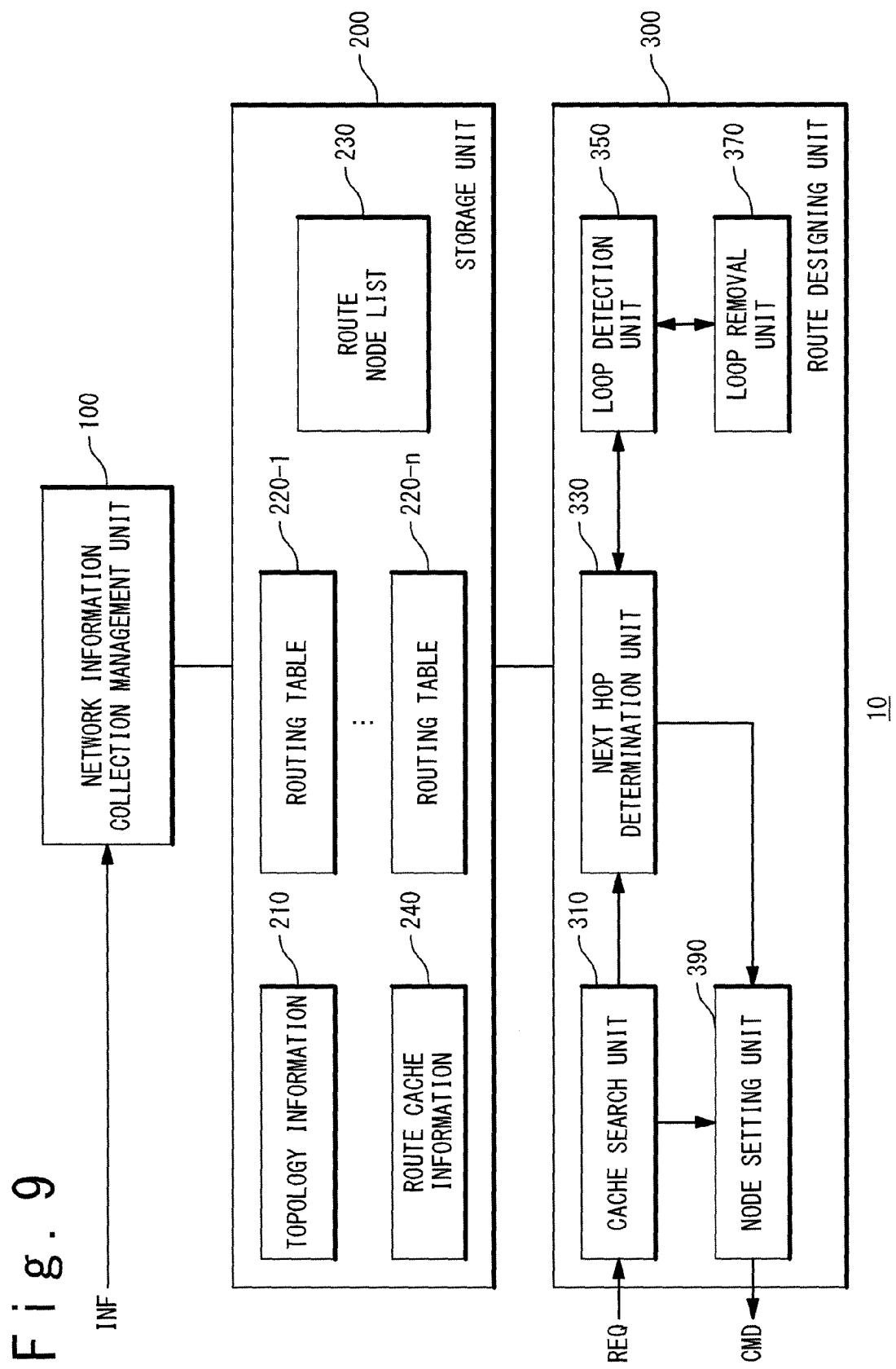
FIG. 9 is a block diagram showing a configuration of a route setup server according to a second exemplary embodiment of the present invention.

FIG. 9 is a block diagram showing a configuration of the route setup server 10 according to a second exemplary embodiment. An overlapping description with the first exemplary embodiment will be omitted as appropriate. According to the second exemplary embodiment, route cache information 240 is further stored in the storage unit 200. Moreover, the route designing unit 300 further includes a cache search unit 310.

FIG. 10 conceptually shows the route cache information 240. The route cache information 240 indicates candidate of the communication route (hereinafter referred to as a "route candidate") with respect to a combination of a source node 5-S and a destination node 5-D. Here, the route candidate is the communication route (route node list 230) that was determined in past times. A plurality of route candidates may already exist with respect to one combination of a source node 5-S and a destination node 5-D.

As shown in FIG. 10, a selection probability also is defined with respect to each route candidate. The selection probability of the route candidate is obtained for the product of the selection probabilities Pij(k) of all the next hop nodes 5-*ij*(*k*) that are selected when determining the route candidate (route node list 230).

Figure 11:
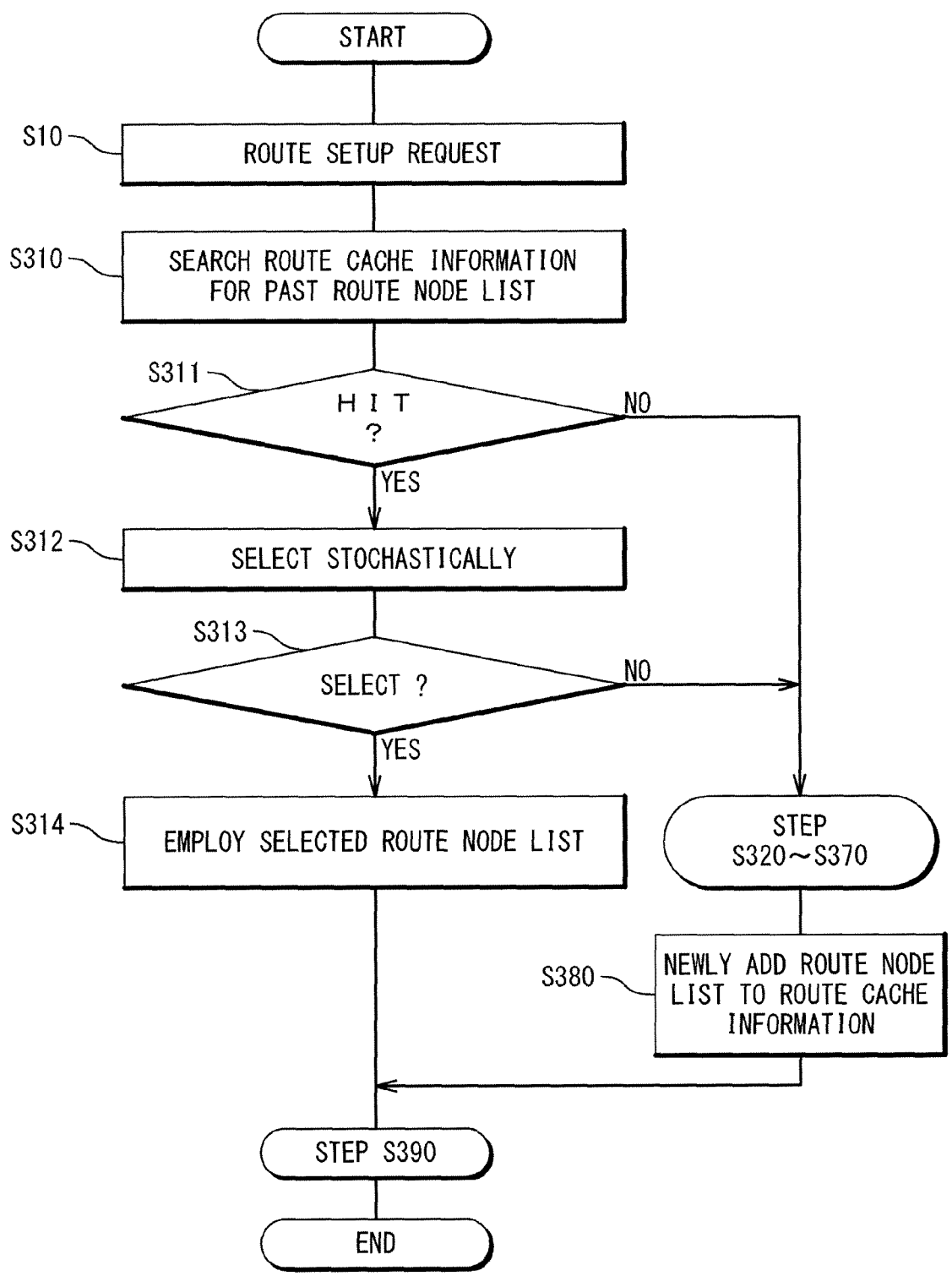
FIG. 11 is a flow chart showing a route setup method according to the second exemplary embodiment.

FIG. 11 is a flow chart showing the route setup processing according to the present exemplary embodiment. Step S10 is the same as in the case of the first exemplary embodiment. According to the second exemplary embodiment, the cache search unit 310 first receives the route setup request REQ.

Step S310:

In response to the route setup request REQ, the cache search unit 310 searches the route cache information 240. That is, the cache search unit 310 checks whether or not the route cache information 240 includes a route candidate (the past route node list 230) with respect to a combination of the source node 5-S and the destination node 5-D specified by the route setup request REQ.

Step S312:

In a case of cache hit, namely, in a case where the route cache information 240 includes a route candidate associated with the route setup request REQ (Step S311; Yes), the cache search unit 310 extracts all the route candidate from the route cache information 240. There is also a case where a plurality of route candidates exists. Therefore, the cache search unit 310 stochastically selects the communication route from the extracted route candidate. More specifically, a random number and the selection probability of the route candidate are utilized, as in the case of the above-described next hop node candidate selection processing (Step S335). It should be noted that as for the route candidate, a sum of the selection probabilities is not necessarily 1. Therefore, even if there exist some route candidates, one route candidate may not be selected, depending on the generated random number. In that sense, the selection of the communication route from the route candidate is stochastic.

Step S314:

If one communication route is selected from the route candidate (Step S313; Yes), the cache search unit 310 employs the selected communication route (route node list 230) as the communication route in this time. After that, the above-described Steps S320 to S370 are skipped and the processing proceeds to the Step S390.

If the route cache information 240 does not include any route candidate associated with the route setup request REQ (Step S311; No) or no communication route is selected from the route candidate (Step S313; No), the cache search unit 310 forwards the route setup request REQ to the next hop determination unit 330. After that, as in the case of the first exemplary embodiment, the Steps S320 to S370 are executed and a new communication route depending on the route setup request REQ is determined.

Step S380:

The next hop determination unit 330 adds the determined new communication route (route node list 230) to the route cache information 240. The added communication route becomes a new route candidate with respect to the combination of the source node 5-S and the destination node 5-D specified by the route setup request REQ this time. After that, the processing proceeds to the Step S390.

According to the present exemplary embodiment, a time for the communication route to be determined can be reduced in the case of cache hit.

3-3. Third Exemplary Embodiment

Figure 12:
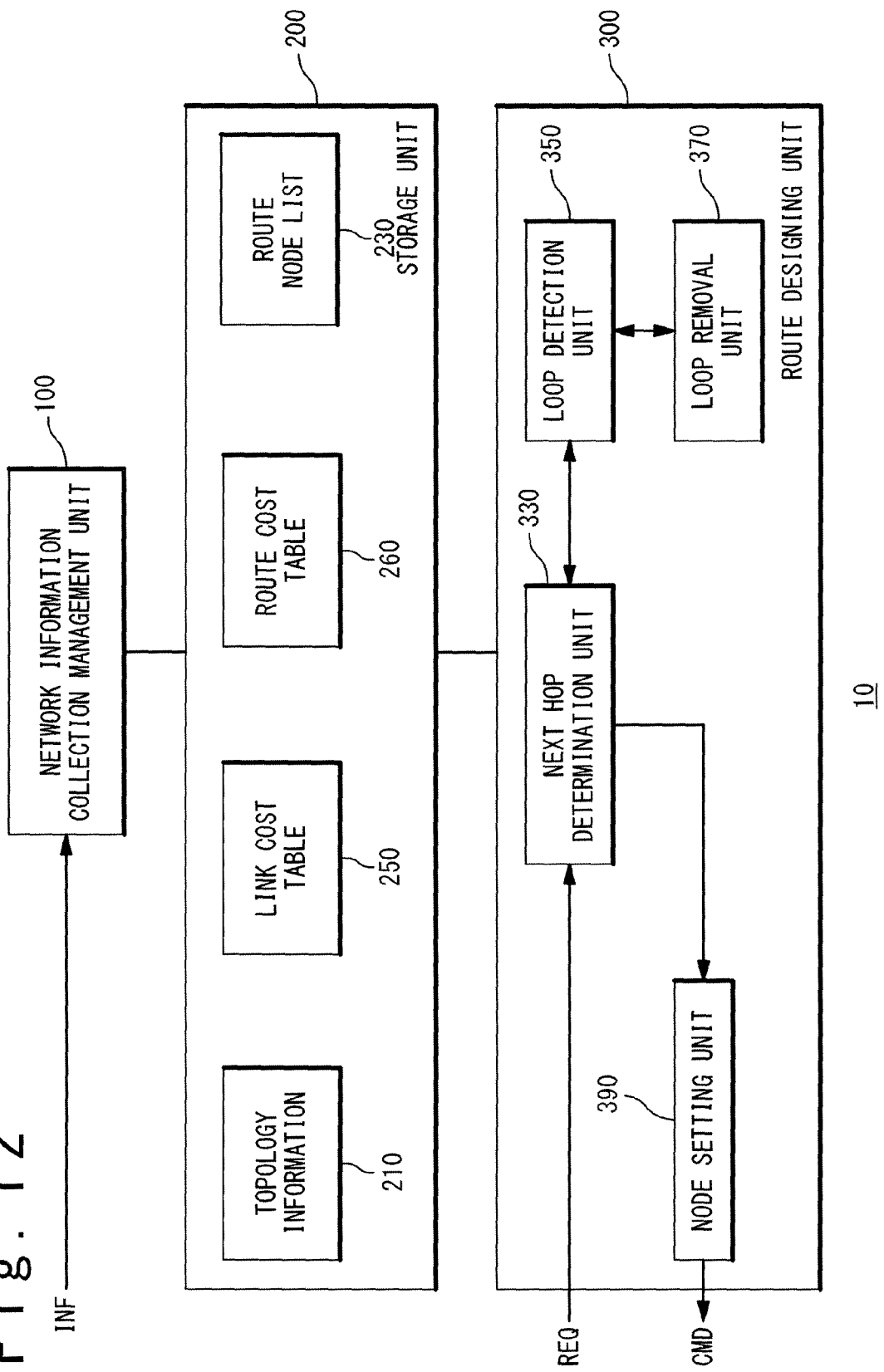
FIG. 12 is a block diagram showing a configuration of a route setup server according to a third exemplary embodiment of the present invention.

FIG. 12 is a block diagram showing a configuration of the route setup server 10 according to a third exemplary embodi-ment. An overlapping description with the first exemplary embodiment will be omitted as appropriate. According to the third exemplary embodiment, a link cost table 250 and a route cost table 260 instead of the routing tables 220-1 to 220-*n* are stored in the storage unit 200.

FIG. 13 conceptually shows the link cost table 250. The link cost table 250 indicates the link cost with respect to each link. One link is defined by a link start-point node and a link end-point node that are adjacent nodes. The link start-point node and the link end-point node are one-hop away from each other. Therefore, the link cost table 250 serves also as the "next hop information" that indicates the candidate of the next hop node with regard to each node 5.

FIG. 14 conceptually shows the route cost table 260. The route cost table 260 indicates route costs for all combinations of the source nodes 5-1 to 5-*n* and the destination nodes 5-1 to 5-*n*. The route cost is a sum of the link costs of respective links that constitute the shortest route from the source node to the destination node. The route cost between arbitrary two nodes can be obtained by referring to the route cost table 260.

The link cost table 250 and the route cost table 260 also are created and updated by the network information collection management unit 100.

According to the third exemplary embodiment, the link cost table 250 and the route cost table 260 instead of the routing table 220 are referred to in the next hop determination processing (Step S330). The others are the same as in the case of the first exemplary embodiment. FIG. 15 is a flow chart showing the next hop determination processing (Step S330) in the present exemplary embodiment.

Step S332:

The next hop determination unit 330 refers to the link cost table 250 to extract the next hop node candidate 5-*ij*(*k*) with respect to the target node 5-*i*. More specifically, the next hop determination unit 330 extracts entry whose link start-point node is identical to the target node 5-*i* from the link cost table 250. The link end-point node included in the extracted entry is the next hop node candidate 5-*ij*(*k*).

Step S333:

Subsequently, the next hop determination unit 330 calculates a route cost of a route from the target node 5-*i* to the destination node 5-*j* through the next hop node candidate 5-*ij*(*k*). A route cost from the target node 5-*i* (the link start-point node) to the next hop node candidate (the link end-point node) is the link cost indicated by the link cost table 250. The route cost from the next hop node candidate 5-*ij*(*k*) to the destination node 5-*j* can be obtained from the route cost table 260. A sum of the two route costs is the route cost to be calculated. Further, the next hop determination unit 330 calculates the selection probability Pij(k) of the next hop node candidate 5-*ij*(*k*) based on the calculated route cost. The relationship between the route cost and the selection probability Pij(k) is the same as in the case of the first exemplary embodiment.

In this manner, the next hop determination unit 330 can extract the next hop node candidate 5-*ij*(*k*) and calculate the selection probability Pij(k). That is, the same information as given by the routing table 220-*i* (see FIG. 5) in the first exemplary embodiment can be obtained. After that, the Steps S335 and S336 are executed as in the case of the first exemplary embodiment.

It should be noted that it is also possible to combine the second exemplary embodiment and the third exemplary embodiment.

While the exemplary embodiments of the present invention have been described above with reference to the attached drawings, the present invention is not limited to these exemplary embodiments and can be modified as appropriate by those skilled in the art without departing from the spirit and scope of the present invention.

While a part of or whole of the above-described exemplary embodiments may be described as the following Supplementary notes, it is not limited to that.

(Supplementary Note 1)

A route setup server that determines a communication route of a flow in a communication network that includes a plurality of nodes, said route setup server comprising:

a storage unit in which next hop information with respect to each of said plurality of nodes is stored, wherein said next hop information indicates a candidate of a next hop node being a forwarding destination of a data; and a route designing unit configured to design, in response to a route setup request specifying a source node and a destination node of a flow, a communication route from said source node to said destination node, wherein said route designing unit comprises:

a next hop determination unit configured to execute next hop determination processing with reference to said next hop information;

a loop detection unit; and a loop removal unit, wherein in said next hop determination processing, said next hop determination unit randomly selects one next hop node from said candidate of said next hop node regarding a target node and updates said target node to said selected one next hop node, wherein said next hop determination unit determines said communication route one-hop by one-hop by initializing said target node to said source node and then repeating said next hop determination processing until said target node becomes said destination node, wherein said loop detection unit checks whether or not a current target node overlaps with a past target node to detect a loop on said communication route determined by then, wherein if said loop is detected, said loop removal unit removes said loop by turning said target node back to any past target node, and wherein after said loop is removed, said next hop determination unit starts over said next hop determination processing from said any past target node.

(Supplementary Note 2)

The route setup server according to Supplementary note 1, wherein said loop removal unit removes said loop by turning said target node back by just one hop.

(Supplementary Note 3)

The route setup server according to Supplementary note 1, wherein said loop removal unit removes said loop by turning said target node back to one overlapping with said current target node.

(Supplementary Note 4)

The route setup server according to any one of Supplementary notes 1 to 3, wherein when starting over said next hop determination processing, said next hop determination unit excludes the previously selected next hop node from said candidate.

(Supplementary Note 5)

The route setup server according to Supplementary note 4, wherein if said candidate includes only the previously selected next hop node, said next hop determination unit further turns said target node back by just one hop and then starts over said next hop determination processing.

(Supplementary Note 6)

The route setup server according to any one of Supplementary notes 1 to 5, wherein said candidate regarding said target node includes a first candidate and a second candidate, wherein in said next hop determination processing, said next hop determination unit generates a random number within a predetermined range, wherein if said generated random number is within a first range included in said predetermined range, said next hop determination unit selects said first candidate, and wherein if said generated random number is within a second range included in said predetermined range, said next hop determination unit selects said second candidate.

(Supplementary Note 7)

The route setup server according to Supplementary note 6, wherein said first range is determined depending on a first selection probability with which said first candidate is selected, and said second range is determined depending on a second selection probability with which said second candidate is selected.

(Supplementary Note 8)

The route setup server according to Supplementary note 7, wherein said first selection probability is in inverse proportion to a cost of a route from said target node to said destination node through said first candidate, and said second selection probability is in inverse proportion to a cost of a route from said target node to said destination node through said second candidate.

(Supplementary Note 9)

The route setup server according to any one of Supplementary notes 1 to 8, wherein route cache information is further stored in said storage unit, wherein said route cache information indicates, as a route candidate, said communication route that is determined in past times with respect to a combination of said source node and said destination node, and wherein said next hop determination unit adds said determined communication route as said route candidate with respect to a combination of said source node and said destination node specified by said route setup request, to said route cache information.

(Supplementary Note 10)

The route setup server according to Supplementary note 9, wherein said route designing unit further comprises a cache search unit, wherein said cache search unit searches said route cache information in response to said route setup request, and wherein if said route cache information includes said route candidate associated with said route setup request, said cache search unit stochastically selects said communication route from said route candidate.

(Supplementary Note 11)

The route setup server according to any one of Supplementary notes 1 to 10, wherein said route designing unit further comprises a node setting unit, wherein said node setting unit instructs each node on said determined communication route to forward a data of said flow along said determined communication route.

(Supplementary Note 12)

A communication network system comprising:

a communication network including a plurality of nodes; and a route setup server configured to determine a communication route of a flow in said communication network, wherein said route setup server comprises:

a storage unit in which next hop information with respect to each of said plurality of nodes is stored, wherein said next hop information indicates a candidate of a next hop node being a forwarding destination of a data; and a route designing unit configured to design, in response to a route setup request specifying a source node and a destination node of a flow, a communication route from said source node to said destination node, wherein said route designing unit comprises:

a next hop determination unit configured to execute next hop determination processing with reference to said next hop information;

a loop detection unit; and a loop removal unit, wherein in said next hop determination processing, said next hop determination unit randomly selects one next hop node from said candidate of said next hop node regarding a target node and updates said target node to said selected one next hop node, wherein said next hop determination unit determines said communication route one-hop by one-hop by initializing said target node to said source node and then repeating said next hop determination processing until said target node becomes said destination node, wherein said loop detection unit checks whether or not a current target node overlaps with a past target node to detect a loop on said communication route determined by then, wherein if said loop is detected, said loop removal unit removes said loop by turning said target node back to any past target node, and wherein after said loop is removed, said next hop determination unit starts over said next hop determination processing from said any past target node.

(Supplementary Note 13)

A route setup method that determines a communication route of a flow in a communication network that includes a plurality of nodes, said route setup method comprising:

storing next hop information with respect to each of said plurality of nodes in a storage device, wherein said next hop information indicates a candidate of a next hop node being a forwarding destination of a data; and designing, in response to a route setup request specifying a source node and a destination node of a flow, a communication route from said source node to said destination node, wherein said designing said communication route comprises:

executing next hop determination processing with reference to said next hop information, wherein said next hop determination processing comprises:

randomly selecting one next hop node from said candidate of said next hop node regarding a target node; and updating said target node to said selected one next hop node;

determining said communication route one-hop by one-hop by initializing said target node to said source node and then repeating said next hop determination processing until said target node becomes said destination node;

checking whether or not a current target node overlaps with a past target node to detect a loop on said communication route determined by then;

removing, if said loop is detected, said detected loop by turning said target node back to any past target node; and starting over said next hop determination processing from said any past target node, after said loop is removed.

(Supplementary Note 14)

A route setup program recorded on a tangible computer-readable medium that, when executed, causes a computer to perform route setup processing that determines a communication route of a flow in a communication network that includes a plurality of nodes, said route setup processing comprising:

storing next hop information with respect to each of said plurality of nodes in a storage device, wherein said next hop information indicates a candidate of a next hop node being a forwarding destination of a data; and designing, in response to a route setup request specifying a source node and a destination node of a flow, a communication route from said source node to said destination node, wherein said designing said communication route comprises:

executing next hop determination processing with reference to said next hop information, wherein said next hop determination processing comprises:

randomly selecting one next hop node from said candidate of said next hop node regarding a target node; and updating said target node to said selected one next hop node;

determining said communication route one-hop by one-hop by initializing said target node to said source node and then repeating said next hop determination processing until said target node becomes said destination node;

checking whether or not a current target node overlaps with a past target node to detect a loop on said communication route determined by then;

removing, if said loop is detected, said detected loop by turning said target node back to any past target node; and starting over said next hop determination processing from said any past target node, after said loop is removed.

This application is based upon and claims the benefit of priority from Japanese patent application No. 2009-069794, filed on Mar. 23, 2009, the disclosure of which is incorporated herein in its entirely by reference.

The invention claimed is:

1. A route setup server that determines a communication route of a flow in a communication network that includes a plurality of nodes, said route setup server comprising:

a storage unit in which next hop information is stored, wherein said next hop information indicates, with respect to each of said plurality of nodes, a candidate of a next hop node being a forwarding destination of a data; and a route designing unit configured to design, in response to a route setup request specifying a source node and a destination node of a flow, a communication route from said source node to said destination node, wherein said route designing unit comprises:

a next hop determination unit configured to execute next hop determination processing with reference to said next hop information;

a loop detection unit; and a loop removal unit, wherein in said next hop determination processing, said next hop determination unit randomly selects one next hop node from said candidate of said next hop node regarding a target node and updates said target node to said selected one next hop node, wherein said next hop determination unit determines said communication route one-hop by one-hop by initializing said target node to said source node and then repeating said next hop determination processing until said target node becomes said destination node, wherein said loop detection unit checks whether or not a current target node overlaps with a past target node to detect a loop on said communication route determined by then, wherein if said loop is detected, said loop removal unit removes said loop by turning said target node back to any past target node, and wherein after said loop is removed, said next hop determination unit starts over said next hop determination processing from said any past target node.

2. The route setup server according to claim 1, wherein said loop removal unit removes said loop by turning said target node back by just one hop.

3. The route setup server according to claim 1, wherein said loop removal unit removes said loop by turning said target node back to one overlapping with said current target node.

4. The route setup server according to claim 1, wherein when starting over said next hop determination processing, said next hop determination unit excludes the previously selected next hop node from said candidate.

5. The route setup server according to claim 4, wherein if said candidate includes only the previously selected next hop node, said next hop determination unit further turns said target node back by just one hop and then starts over said next hop determination processing.

6. The route setup server according to claim 1, wherein said candidate regarding said target node includes a first candidate and a second candidate, wherein in said next hop determination processing, said next hop determination unit generates a random number within a predetermined range, wherein if said generated random number is within a first range included in said predetermined range, said next hop determination unit selects said first candidate, and wherein if said generated random number is within a second range included in said predetermined range, said next hop determination unit selects said second candidate.

7. The route setup server according to claim 6, wherein said first range is determined depending on a first selection probability with which said first candidate is selected, and said second range is determined depending on a second selection probability with which said second candidate is selected.

8. The route setup server according to claim 7, wherein said first selection probability is in inverse proportion to a cost of a route from said target node to said destination node through said first candidate, and said second selection probability is in inverse proportion to a cost of a route from said target node to said destination node through said second candidate.

9. The route setup server according to claim 1, wherein route cache information is further stored in said storage unit, wherein said route cache information indicates, as a route candidate, said communication route that is determined in past times with respect to a combination of said source node and said destination node, and wherein said next hop determination unit adds said determined communication route as said route candidate with respect to a combination of said source node and said destination node specified by said route setup request, to said route cache information.

10. The route setup server according to claim 9, wherein said route designing unit further comprises a cache search unit, wherein said cache search unit searches said route cache information in response to said route setup request, and wherein if said route cache information includes said route candidate associated with said route setup request, said cache search unit stochastically selects said communication route from said route candidate.

11. The route setup server according to claim 1, wherein said route designing unit further comprises a node setting unit, wherein said node setting unit instructs each node on said determined communication route to forward a data of said flow along said determined communication route.

12. A communication network system comprising:
a communication network including a plurality of nodes; and
a route setup server configured to determine a communication route of a flow in said communication network,
wherein said route setup server comprises:
a storage unit in which next hop information is stored, wherein said next hop information indicates, with respect to each of said plurality of nodes, a candidate of a next hop node being a forwarding destination of a data; and
a route designing unit configured to design, in response to a route setup request specifying a source node and a destination node of a flow, a communication route from said source node to said destination node,
wherein said route designing unit comprises:
a next hop determination unit configured to execute next hop determination processing with reference to said next hop information;
a loop detection unit; and
a loop removal unit,
wherein in said next hop determination processing, said next hop determination unit randomly selects one next hop node from said candidate of said next hop node regarding a target node and updates said target node to said selected one next hop node,
wherein said next hop determination unit determines said communication route one-hop by one-hop by initializing said target node to said source node and then repeating said next hop determination processing until said target node becomes said destination node,
wherein said loop detection unit checks whether or not a current target node overlaps with a past target node to detect a loop on said communication route determined by then,
wherein if said loop is detected, said loop removal unit removes said loop by turning said target node back to any past target node, and
wherein after said loop is removed, said next hop determination unit starts over said next hop determination processing from said any past target node.

13. A route setup method that determines a communication route of a flow in a communication network that includes a plurality of nodes,
said route setup method comprising:
storing next hop information in a storage device, wherein said next hop information indicates, with respect to each of said plurality of nodes, a candidate of a next hop node being a forwarding destination of a data; and designing, in response to a route setup request specifying a source node and a destination node of a flow, a communication route from said source node to said destination node, wherein said designing said communication route comprises:

executing next hop determination processing with reference to said next hop information, wherein said next hop determination processing comprises:

randomly selecting one next hop node from said candidate of said next hop node regarding a target node; and updating said target node to said selected one next hop node;

determining said communication route one-hop by one-hop by initializing said target node to said source node and then repeating said next hop determination processing until said target node becomes said destination node;

checking whether or not a current target node overlaps with a past target node to detect a loop on said communication route determined by then;

removing, if said loop is detected, said detected loop by turning said target node back to any past target node; and starting over said next hop determination processing from said any past target node, after said loop is removed.

14. A route setup program recorded on a tangible computer-readable medium that, when executed, causes a computer to perform route setup processing that determines a communication route of a flow in a communication network that includes a plurality of nodes, said route setup processing comprising:

storing next hop information in a storage device, wherein said next hop information indicates, with respect to each of said plurality of nodes, a candidate of a next hop node being a forwarding destination of a data; and designing, in response to a route setup request specifying a source node and a destination node of a flow, a communication route from said source node to said destination node, wherein said designing said communication route comprises:

executing next hop determination processing with reference to said next hop information, wherein said next hop determination processing comprises:

randomly selecting one next hop node from said candidate of said next hop node regarding a target node; and updating said target node to said selected one next hop node;

determining said communication route one-hop by one-hop by initializing said target node to said source node and then repeating said next hop determination processing until said target node becomes said destination node;

checking whether or not a current target node overlaps with a past target node to detect a loop on said communication route determined by then;

removing, if said loop is detected, said detected loop by turning said target node back to any past target node; and starting over said next hop determination processing from said any past target node, after said loop is removed.

* * * * *